United States Patent
Hardy et al.

(10) Patent No.: US 7,853,098 B2
(45) Date of Patent: Dec. 14, 2010

(54) IMAGE REGISTRATION METHOD IMPROVEMENT

(75) Inventors: Stephen James Hardy, West Pymble (AU); Peter Alleine Fletcher, Rozelle (AU); Kieran Gerard Larkin, Putney (AU)

(73) Assignee: Canon Kabushiki Kaisha, Tokyo (JP)

( * ) Notice: Subject to any disclaimer, the term of this patent is extended or adjusted under 35 U.S.C. 154(b) by 1141 days.

(21) Appl. No.: 10/555,446

(22) PCT Filed: Jul. 2, 2004

(86) PCT No.: PCT/AU2004/000891
§ 371 (c)(1),
(2), (4) Date: Aug. 28, 2006

(87) PCT Pub. No.: WO2005/004059
PCT Pub. Date: Jan. 13, 2005

(65) Prior Publication Data
US 2007/0122060 A1    May 31, 2007

(30) Foreign Application Priority Data
Jul. 8, 2003    (AU) ............................ 2003903511

(51) Int. Cl.
*G06K 9/32* (2006.01)
(52) U.S. Cl. ........................ 382/294; 382/280
(58) Field of Classification Search .............. 382/294
See application file for complete search history.

(56) References Cited

U.S. PATENT DOCUMENTS

| | | | |
|---|---|---|---|
| 6,266,452 B1 * | 7/2001 | McGuire | 382/294 |
| 6,343,143 B1 | 1/2002 | Guillemaud et al. | 382/130 |
| 6,373,970 B1 * | 4/2002 | Dong et al. | 382/128 |
| 6,424,725 B1 * | 7/2002 | Rhoads et al. | 382/100 |
| 7,187,810 B2 * | 3/2007 | Clune et al. | 382/294 |
| 7,349,583 B2 * | 3/2008 | Kumar et al. | 382/294 |
| 7,539,354 B2 * | 5/2009 | Hardy et al. | 382/276 |
| 2006/0050985 A1 * | 3/2006 | Hardy et al. | 382/276 |
| 2006/0061777 A1 * | 3/2006 | Duggan et al. | 358/1.1 |

(Continued)

FOREIGN PATENT DOCUMENTS

JP    2000-268178    9/2000

(Continued)

OTHER PUBLICATIONS

Reddy, Srinivasa B. Chatterji, B. N., 'An FFT-based technique for translation, rotation, and scale-invariant image registration', IEEE Transactions on Image Processing, vol. 5, No. 8, 1266-1271 (1996).*

(Continued)

*Primary Examiner*—Sath V Perungavoor
(74) *Attorney, Agent, or Firm*—Fitzpatrick, Cella, Harper & Scinto

(57) ABSTRACT

A method (200) of determining at least rotation and scale parameters of a transformation relating two images is disclosed. The method (200) starts by forming a spatial domain representation of each of the images that is invariant to translation of the images. A correlation in the log-polar domain is next performed between the representations. After detecting a magnitude peak in the correlation, the method (200) determines the rotation and scale parameters from the position of the magnitude peak.

19 Claims, 8 Drawing Sheets

U.S. PATENT DOCUMENTS

2006/0083407 A1* 4/2006 Zimmermann et al. ...... 382/107
2007/0122060 A1* 5/2007 Hardy et al. ................ 382/286

FOREIGN PATENT DOCUMENTS

JP 2004-310243 11/2004

OTHER PUBLICATIONS

European Supplementary Search Report dated Jun. 4, 2010 in European Patent Application No. 04737512.6.
Brandt, et al., "Representations that Uniquely Characterize Images Modulo Translation, Rotation and Scaling", Pattern Recognition Letters, vol. 17, pp. 1001-1015 (1996).
Chen, et al., "Symmetric Phase-Only Matched Filtering of Fourier-Mellin Transforms for Image Registration and Recognition", IEEE Transactions on Pattern Analysis and Machine Intelligence, vol. 16, No. 12, pp. 1156-1168 (Dec. 1994).
Wolberg, et al., "Robust Image Registration Using Log-Polar Transform", Dept. of Computer Science, City College of New York, pp. 493-496 (2000).
Office Action, dated Aug. 4, 2008, in JP 2006-515273.

* cited by examiner

IMAGE REGISTRATION METHOD IMPROVEMENT

FIELD OF THE INVENTION

The present invention relates generally to image registration and, in particular, to determining a transformation that registers two images that are related by rotation, scale and translation.

BACKGROUND

Image registration is the process of determining the correspondence between pixel elements in a pair of images that have common subject matter. In particular, image registration involves determining the parameters of a transformation that relates the pixel elements in the pair of images. Image registration is therefore an important aspect of image matching, where two images are compared for common subject matter under the assumption that some geometrical transformation exists that relates substantial portions of the two images. Image registration is also used in satellite and medical imagery where a series of partially overlapping images are obtained, and a mosaic of the individual images has to be formed to thereby form a single large image.

Image registration is also useful in camera calibration, where an image of a known object is captured and the location of that known object within the image is calculated to determine some unknown parameters of the imaging device. Yet another application of image registration is as part of a system for determining the relative video camera orientation and position between video frames in a video sequence.

A simple form of image registration may be used when the two images are related through translation only. In such a case, a matched filtering method may be used to find the translation relating the two images. Cross-correlation and phase-correlation are examples of two such matched filtering methods.

Cross-correlation may be performed in the spatial or frequency domain. Consider two images, $I_1(x, y)$, and $I_2(x, y)$ that are functions of pixel coordinates x and y. The cross-correlation of the two images $I_1(x, y)$, and $I_2(x, y)$ in the spatial domain is defined by:

$$C(x', y') = \sum_x \sum_y I_1(x, y) I_2(x + x', y + y') \quad (1)$$

If the two images $I_1(x, y)$, and $I_2(x, y)$ are related by a simple translation $(\Delta_x, \Delta_y)$ whereby:

$$I_2(x, y) = I_1(x - \Delta_x, y - \Delta_y), \quad (2)$$

then the cross-correlation $C(x', y')$ has a maximum value at the translation coordinates $(\Delta_x, \Delta_y)$ where:

$$C(\Delta_x, \Delta_y) = \sum_x \sum_y I_1(x, y)^2 \quad (3)$$

Thus, by calculating the cross-correlation $C(x', y')$ of the two images $I_1(x, y)$, and $I_2(x, y)$, the translation $(\Delta_x, \Delta_y)$ that registers the two images $I_1(x, y)$, and $I_2(x, y)$ may be determined.

Cross-correlation is generally performed using the Fast Fourier Transform (FFT). For an image $I_n(x, y)$, the discrete Fourier transform $\Im(I)$ is defined by:

$$\Im[I_n](u, v) = \sum_{x=0}^{N_x} \sum_{y=0}^{N_y} I_n(x, y) e^{-2\pi i x u/N_x} e^{-2\pi i y v/N_y}, \quad (4)$$

where $N_x$ and $N_y$ are the image dimensions in the x and y dimensions respectively. The inverse discrete Fourier transform $\Im^{-1}(F)$ is defined by:

$$\Im^{-1}(F) = \frac{1}{N_x N_y} \sum_{u=0}^{N_x} \sum_{v=0}^{N_y} F[I](u, v) e^{2\pi i x u/N_x} e^{2\pi i y v/N_y}. \quad (5)$$

The FFT is a computationally efficient method of calculating the Discrete Fourier Transform $\Im(I)$ and its inverse $\Im^{-1}(F)$.

The cross-correlation C may be calculated through:

$$C = \Im^{-1}(\Im(I_1)\Im(I_2)^*), \quad (6)$$

where $\Im(I_2)^*$ denotes the complex conjugation of the Discrete Fourier Transform $\Im(I_2)$. Thus, taking the inverse FFT $\Im^{-1}()$ of the product of the FFT of one image $\Im(I_1)$ and the complex conjugate of the FFT of the other image $\Im(I_2)^*$ leads to a further image which contains the values of the cross-correlation C which is equivalent to that defined in Equation (1).

Phase-correlation C' is another matched filtering method that is often used and is defined by:

$$C' = \Im^{-1}\left(\frac{\Im(I_1)}{|\Im(I_1)|} \frac{\Im(I_2)^*}{|\Im(I_2)|}\right) \quad (7)$$

That is, rather than using the discrete Fourier transforms $\Im(I)$ of the images $I_1(x, y)$, and $I_2(x, y)$, only the complex phase part of the discrete Fourier transforms of the images are used. If the images $I_1(x, y)$, and $I_2(x, y)$ are related by a translational offset $(\Delta_x, \Delta_y)$, the phase correlation C' will have a very sharp peak at the translation coordinates $(\Delta_x, \Delta_y)$ that relates the two images $I_1(x, y)$, and $I_2(x, y)$, and small values elsewhere in the phase correlation C'.

Whereas matched filtering is used when the two images $I_1(x, y)$, and $I_2(x, y)$ are related through translation only, when the two images $I_1(x, y)$, and $I_2(x, y)$ are related by a rotation and a scale transformation, such that image $I_2(x, y)$ is a rotated and scaled version of image $I_1(x, y)$, i.e.

$$I_2(x, y) = I_1(s(x \cos \theta + y \sin \theta), s(-x \sin \theta + y \cos \theta)), \quad (8)$$

wherein s is a scale factor and θ is a rotation angle, the unknown rotation θ and scale s parameters may be determined by transforming the images $I_1(x, y)$, and $I_2(x, y)$ into a log-polar coordinate space through:

$$\rho = \frac{1}{2} \log(x^2 + y^2) \quad (9)$$

$$\phi = \tan^{-1}\frac{y}{x}$$

The translation above leads to a relationship between the images $I_1(x, y)$, and $I_2(x, y)$ in the log-polar space as follows:

$$I_2(\rho, \phi) = I_1(\rho + \log s, \phi + \theta), \quad (10)$$

The matched filtering methods described above may then be used to determine the scale and rotation parameters s and θ from the peak in the correlation C at coordinate (log s, θ).

Image registration is also often applied to a pair of images $I_1(x, y)$ and $I_2(x, y)$ where the correspondence between pixel elements is not a simple transformation, such as a translation, or rotation and scale. It may be necessary to register two images $I_1(x, y)$ and $I_2(x, y)$ that are captured using different imaging devices, or by the same imaging device but where each image is captured using a different configuration of the imaging device. In such cases the transformation includes translation, rotation and scaling.

Consider two images $I_1(x, y)$, and $I_2(x, y)$ that are related by a translation as well as a rotation and a scale, such that:

$$I_2(x, y) = I_1(s(x \cos \theta + y \sin \theta) + \Delta_x, s(-x \sin \theta + y \cos \theta) + \Delta_y) \quad (11)$$

Current methods of registering images related by translation, rotation and scale, suffer from poor signal to noise ratios over a large class of images when the transformation parameters are such that the overlap between the two images is significantly reduced. Furthermore, current methods contain a 180-degree ambiguity, which leads to computational inefficiencies. This ambiguity is the result of the fact that the Fourier magnitude of a real function is symmetric.

SUMMARY

It is an object of the present invention to substantially overcome, or at least ameliorate, one or more disadvantages of existing arrangements.

According to a first aspect of the present disclosure, there is provided a method of determining at least rotation and scale parameters of a transformation relating two images, said method comprising the steps of:

forming a spatial domain representation of each of said images that is invariant to translation of said images;

performing Fourier-Mellin correlation between said representations;

detecting a magnitude peak in said correlation; and determining said rotation and scale parameters from the position of said magnitude peak.

According to a second aspect of the present disclosure, there is provided a method of determining at least rotation and scale parameters of a transformation relating two images, said method comprising the steps of:

forming a multi-channel function of each of said images by applying an operator to said images, said operator being commutative within a constant to rotation and scale;

forming a representation of each of said multi-channel functions that is invariant to translation of said multi-channel function;

performing Fourier-Mellin correlation between said representations;

detecting a magnitude peak in said correlation; and determining said rotation and scale parameters from the position of said magnitude peak.

According to another aspect of the present disclosure, there is provided an apparatus for implementing any one of the aforementioned methods.

According to another aspect of the present disclosure there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present invention will now be described with reference to the drawings, in which.

DETAILED DESCRIPTION

Figure 1:
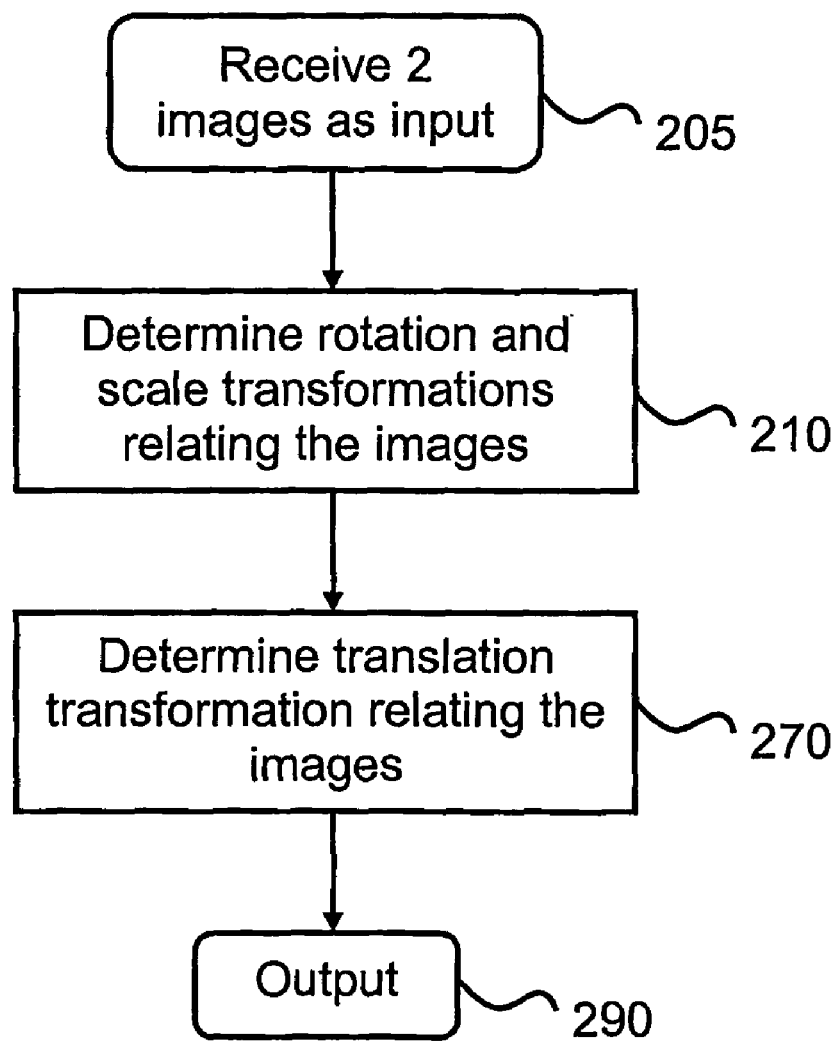
FIG. 1 is a flow diagram of a method of determining a transformation relating two images according to an embodiment of the present invention, with the transformation including rotation, scale and translation.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to current methods of registering images should not be interpreted as a representation by the present inventors or patent applicant that such methods in any way form part of the common general knowledge in the art.

Figure 2:
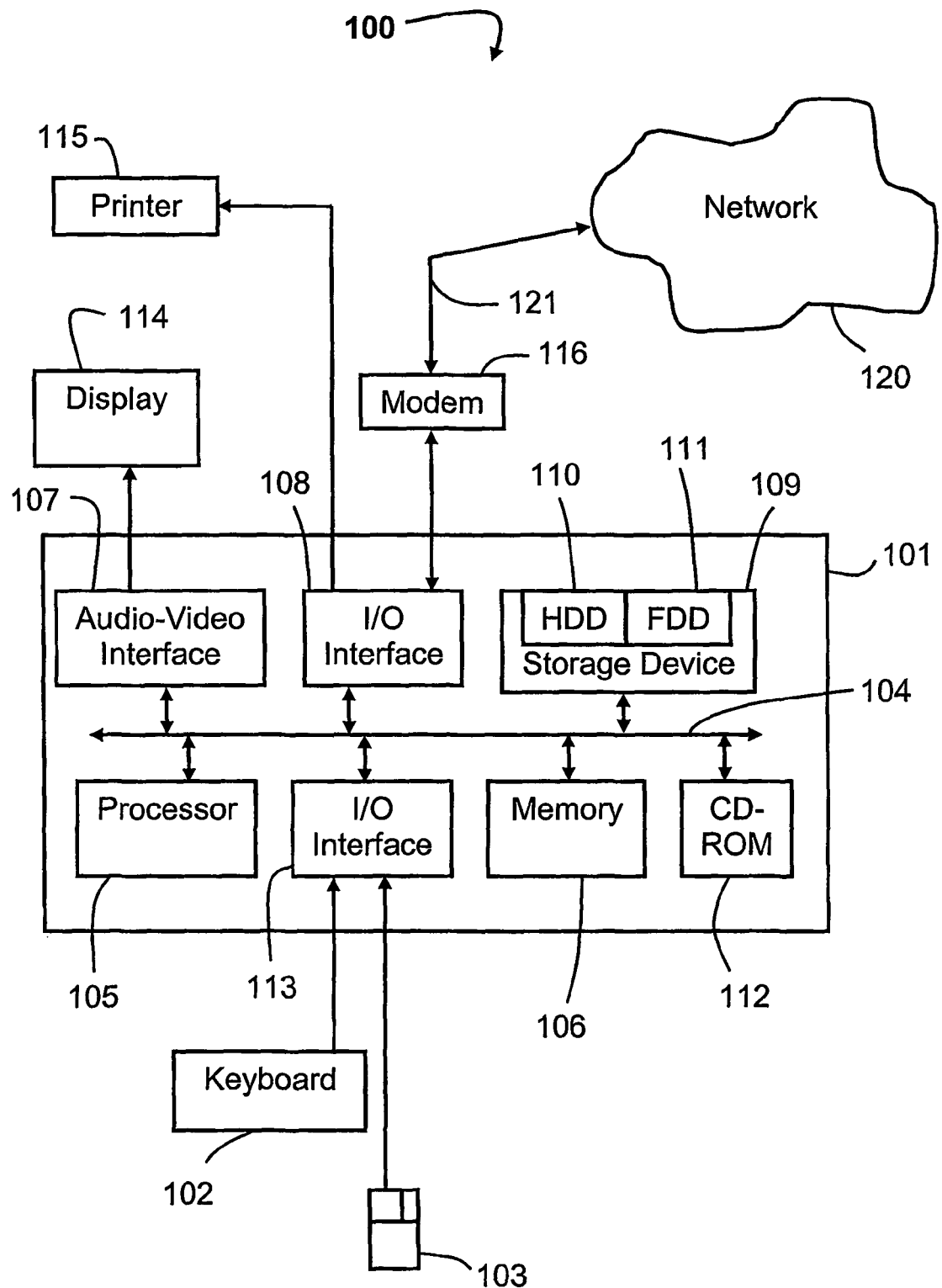
FIG. 2 is a schematic block diagram of a general purpose computer upon which arrangements described can be practiced.

FIG. 1 is a flow diagram of a method 200 of determining a transformation relating two images according to an embodiment of the present invention, with the transformation including rotation, scale and translation. The method 200 of determining a transformation relating two images is preferably practiced using a general-purpose computer system 100, such as that shown in FIG. 2 wherein the method of FIG. 1 may be implemented as software, such as an application program, executing within the computer system 100. In particular, the steps of the method 200 of determining a transformation relating two images are effected by instructions in the software that are carried out by the computer system 100. The software may be stored in a computer readable medium, including the storage devices described below, for example. The software is loaded into the computer system 100 from the computer readable medium, and then executed by the computer system 100. A computer readable medium having such software or computer program recorded on it is a computer program product. The use of the computer program product in the computer system 100 preferably effects an advantageous apparatus for determining a transformation relating two images.

The computer system 100 is formed by a computer module 101, input devices such as a keyboard 102 and mouse 103, output devices including a printer 115 and a display device 114. A Modulator-Demodulator (Modem) transceiver device 116 is used by the computer module 101 for communicating to and from a communications network 120, for example connectable via a telephone line 121 or other functional medium. The modem 116 can be used to obtain access to the Internet, and other network systems, such as a Local Area Network (LAN) or a Wide Area Network (WAN), and may be incorporated into the computer module 101 in some implementations.

The computer module 101 typically includes at least one processor unit 105, and a memory unit 106, for example formed from semiconductor random access memory (RAM) and read only memory (ROM). The module 101 also includes an number of input/output (I/O) interfaces including a video interface 107 that couples to the video display 114, an I/O interface 113 for the keyboard 102 and mouse 103, and an interface 108 for the modem 116 and printer 115. A storage device 109 is provided and typically includes a hard disk drive 110 and a floppy disk drive 111. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art.

Typically, the application program is resident on the hard disk drive 110 and read and controlled in its execution by the processor 105. Intermediate storage of the program and any data fetched from the network 120 may be accomplished using the semiconductor memory 106, possibly in concert with the hard disk drive 110. In some instances, the application program may be supplied to the user encoded on a CD-ROM or floppy disk and read via the corresponding drive 112 or 111, or alternatively may be read by the user from the network 120 via the modem device 116. The term "computer-readable memory medium" as used herein refers to any storage medium that participates in providing instructions and/or data to the computer system 100 for execution and/or processing. Transmission media may also be used to provide the instructions and/or data.

The present invention also implicitly discloses a computer program, in that it would be apparent to the person skilled in the art that the individual steps of the preferred method 100 described herein are able to be put into effect by computer code.

A method is disclosed that may be used for determining a transformation relating two images $I_1(x, y)$ and $I_2(x, y)$ that are assumed to be related by rotation, scale and translation, such that:

$$I_2(x, y) = I_1(s(x \cos \theta + y \sin \theta) + \Delta_x, s(-x \sin \theta + y \cos \theta) + \Delta_y) \quad (12)$$

where s is a scale factor, θ is a rotation angle, and $(\Delta_x, \Delta_y)$ is a translation. The method comprises two stages—a first which determines the unknown scale and rotation transformation up to a one-hundred and eighty degree ambiguity in the rotation angle θ, and a second which determines the translation $(\Delta_x, \Delta_y)$ and resolves the angular ambiguity. The Fourier transform of the scaled, rotated and shifted image $I_2(x, y)$ is related to the other image $I_1(x, y)$ through $$\mathfrak{I}[I_2](u, v) = \frac{1}{|s|^2} \mathfrak{I}[I_1]\left(\frac{u\cos\vartheta + v\sin\vartheta}{s}, \frac{-u\sin\vartheta + v\cos\vartheta}{s}\right) e^{2\pi i u \Delta_x} e^{2\pi i u \Delta_y}. \quad (13)$$

In the first stage, by taking the magnitude of the Fourier transform $\mathfrak{I}[I_2]$, a translation invariant of the image is formed, $$|\mathfrak{I}[I_2](u, v)| = \frac{1}{|s|^2}\left|\mathfrak{I}[I_1]\left(\frac{u\cos\vartheta + v\sin\vartheta}{s}, \frac{-u\sin\vartheta + v\cos\vartheta}{s}\right)\right|. \quad (14)$$

The translation invariant is not dependent on the translation $(\Delta_x, \Delta_y)$ of the image. Performing a log-polar transformation of the Fourier magnitude leads to a simple linear relationship between the Fourier magnitudes of the two images as follows:

$$|\mathfrak{I}[I_2](R, \Phi)| = \frac{1}{|s|^2}|\mathfrak{I}[I_1](R - \log s, \Phi + \vartheta)|. \quad (15)$$

A correlation between a log-polar resampling of the Fourier magnitude of the two images contains a peak at log s and θ, thereby allowing the unknown scale s and rotation angle θ parameters relating the two images $I_1(x, y)$ and $I_2(x, y)$ to be determined, with the rotation angle θ having a 180-degree ambiguity. This ambiguity is the result of the fact that the Fourier magnitude of a real function is symmetric.

The second stage of the method of determining the transformation relating the two images $I_1(x, y)$ and $I_2(x, y)$ starts by undoing the now known scale and rotation translations for both possible rotation angles θ for the second image $I_2(x, y)$ to produced a partially registered image. The partially registered image is then correlated with the first image $I_1(x, y)$ to determine the unknown translation $(\Delta_x, \Delta_y)$ between the two images $I_1(x, y)$ and $I_2(x, y)$. The rotation angle θ that gives the best spatial correlation between the partially registered image and the first image $I_1(x, y)$ is considered to be the correct rotation angle θ. The complete transformation relating the two images $I_1(x, y)$ and $I_2(x, y)$ is now known.

Referring again to FIG. 1 where the flow diagram of method 200 of determining a transformation relating two images $I_1(x, y)$ and $I_2(x, y)$ according to the present invention is shown. The method 200 receives in step 205 as input the two images $I_1(x, y)$ and $I_2(x, y)$. The images $I_1(x, y)$ and $I_2(x, y)$ are assumed to have a substantial overlap in image content. The images $I_1(x, y)$ and $I_2(x, y)$ are functions with real values, which are typically represented by an array of values between 0 and a predetermined maximum value, commonly 1 or 255. The images $I_1(x, y)$ and $I_2(x, y)$ are typically retrieved from the storage device 109 (FIG. 2) in step 205. However, the images $I_1(x, y)$ and $I_2(x, y)$ may also be received from the network 120 or from an imaging device (not illustrated) connected to the computer system 100.

Image registration is next performed in steps 210 and 270. In particular, the rotation and scale parameters, θ and s respectively, which relate the two images $I_1(x, y)$ and $I_2(x, y)$ are determined in step 210, and the translation $(\Delta_x, \Delta_y)$ is determined in step 270. Method 200 ends in step 290 where an output is produced to the display device 114 containing two substantially aligned images $I''_1(x, y)$ and $I_2(x, y)$. Alternatively the scale factor s, rotation angle θ, and translation $(\Delta_x, \Delta_y)$ are output on the display device 114.

Figure 3:
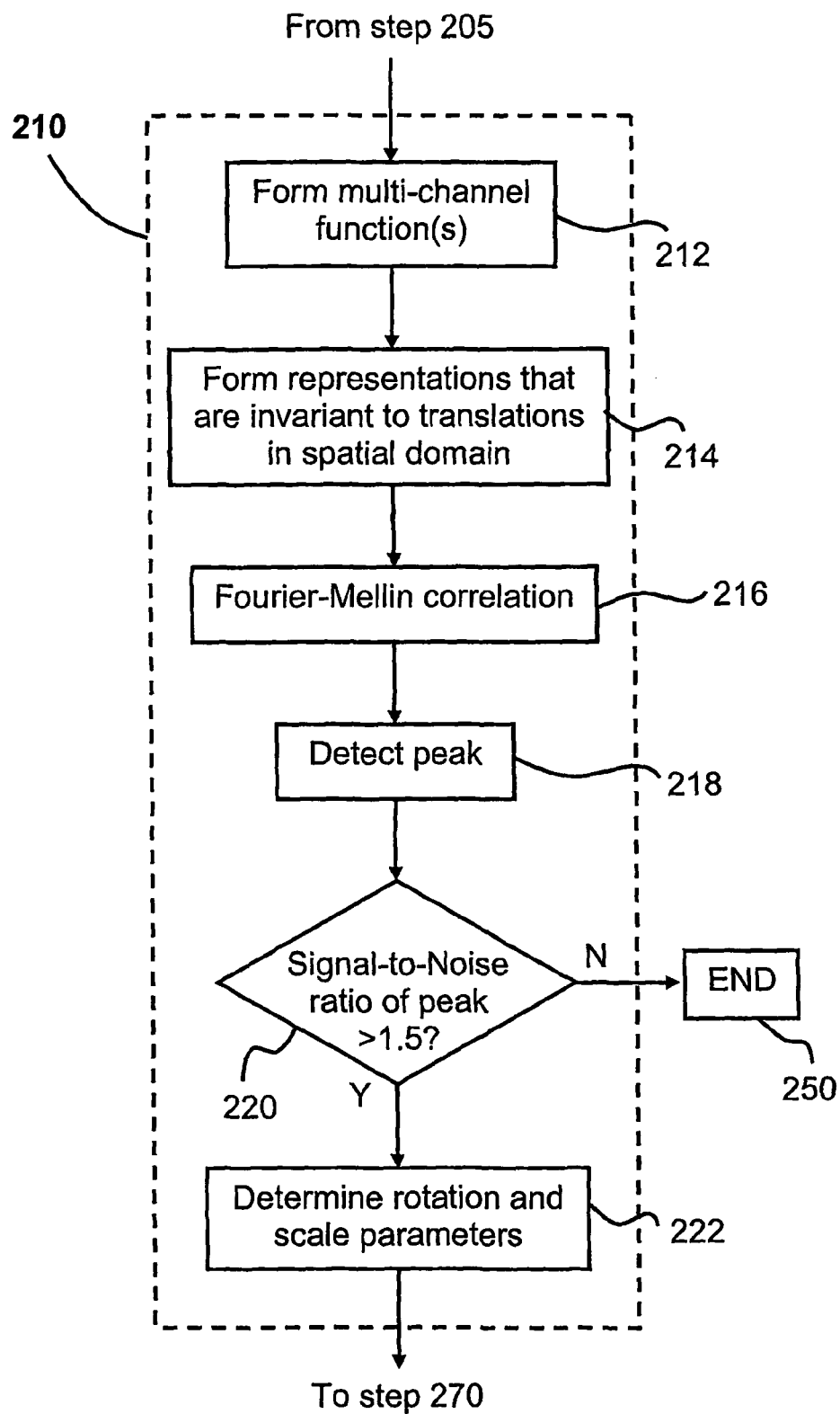
FIG. 3 shows a more detailed flow diagram of a step of determining the rotation and scale parameters which relates the two images, and performed in the method shown in FIG. 1.

FIG. 3 shows a more detailed flow diagram of step 210 (FIG. 1) where the rotation and scale parameters, θ and s respectively, which relate the two images $I_1(x, y)$ and $I_2(x, y)$ are determined. Step 210 of the preferred implementation starts in sub-step 212 where the processor 105 (FIG. 2) forms a multi channel function from the images $I_1(x, y)$ and $I_2(x, y)$.

In the preferred implementation the processor 105 forms complex images $\bar{I}_1(x, y)$ and $\bar{I}_2(x, y)$ from the images $I_1(x, y)$, and $I_2(x, y)$, such that when each complex image $\bar{I}_n(x, y)$ is Fourier transformed, a non-Hermitian result with a non-symmetric Fourier magnitude is produced. Therefore, using a complex image $\bar{I}_n(x, y)$ as the input to the Fourier-Mellin correlation that follows, a 180-degree ambiguity that would otherwise exist is removed.

The complex images $\bar{I}_1(x, y)$ and $\bar{I}_2(x, y)$ are formed by applying an operator $\gamma\{\ \}$ to the images $I_1(x, y)$, and $I_2(x, y)$, where the operator $\gamma\{\ \}$ is commutative within a constant to rotation and scale, ie.

$$T_{\beta,s}[\gamma\{f(x, y)\}]=g(\beta,s)\gamma\{T_{\beta,s}[f(x, y)]\}; \qquad (16)$$

where $\beta$ and $s$ are rotation and scale factors, $T_{\beta,s}$ is a rotation-scale transformation, and g is some function of rotation $\beta$ and scale $s$.

Examples of the operator $\gamma\{\ \}$ include:

$$\gamma\{f(x, y)\} = f(x, y) + if^2(x, y); \qquad (17)$$

$$\gamma\{f(x, y)\} = \frac{\partial f}{\partial x} + i\frac{df}{dy}; \qquad (18)$$

and $$\gamma\{f(x, y)\} = \left(\frac{\partial f}{\partial x} + i\frac{\partial f}{\partial y}\right)^2. \qquad (19)$$

Preferred steps of forming a complex image $\bar{I}_n(x, y)$ from an image $I_n(x, y)$ are described below with reference to FIGS. 5 and 6.

The multi channel functions formed in sub-step 212, those being the complex images $\bar{I}_1(x, y)$ and $\bar{I}_2(x, y)$ in the preferred implementation, are then each processed by the processor 105 in sub-step 214 to form a representation $T_1(x, y)$ and $T_2(x, y)$ of each of the two complex images $\bar{I}_1(x, y)$ and $\bar{I}_2(x, y)$, where representations $T_1(x, y)$ and $T_2(x, y)$ are translation invariant in the spatial domain. It is understood that translations of images cause cropping of the images. Translation invariant therefore means substantially translation invariant, as the cropping introduces changes to the images separate to changes introduced by the translation.

Sub-step 214 is followed by sub-step 216 where the processor 105 performs Fourier-Mellin correlation on the representations $T_1(x, y)$ and $T_2(x, y)$ of the two complex images $\bar{I}_1(x, y)$ and $\bar{I}_2(x, y)$, thereby producing a phase correlation image in which possible rotation and scaling that relate the input images $I_1(x, y)$ and $I_2(x, y)$ are represented by isolated peaks. Fourier-Mellin correlation is described in more detail below with reference to FIG. 8.

Because the representations $T_1(x, y)$ and $T_2(x, y)$ are translation invariant in the spatial domain, the Fourier-Mellin correlation produces superior results for images $I_1(x, y)$ and $I_2(x, y)$ that are related by a wide range of translation, rotation and scale factors. Such superior results typically include increased matched filter signal to noise ratio for images that are related by rotation, scale and translation transformations, and enhanced discrimination between images that are not related by a rotation, scale and translation transformations.

Method 200 continues to sub-step 218 where the processor 105 detects the location of a magnitude peak within the phase correlation image. The location of the magnitude peak is interpolated through quadratic fitting, thereby detecting the location of the magnitude peak to sub-pixel accuracy.

The processor 105 then determines in sub-step 220 whether the detected magnitude peak has a signal to noise ratio that is greater than a predetermined threshold. The threshold used in the preferred implementation is 1.5.

If it is determined that the magnitude peak has a signal to noise ratio that is greater than the predetermined threshold, the processor 105 uses in sub-step 222 the location of the magnitude peak to determine the scale s and rotation angle θ parameters which relate the two images $I_1(x, y)$ and $I_2(x, y)$. If the magnitude peak is at location $(\zeta, \alpha)$, then the scale s and rotation angle θ parameters which relate the two images $I_1(x, y)$ and $I_2(x, y)$ are:

$$s = e^{-\alpha\zeta}, \text{ and} \qquad (20)$$

$$\vartheta = -\frac{2\pi\alpha}{Q}. \qquad (21)$$

where α and Q are constants related to the log-polar resampling step 630 of the Fourier-Mellin correlation described below with reference to FIG. 8.

If it is determined in sub-step 220 that the peak has a signal to noise ratio that is not greater than the predetermined threshold, then it is concluded that the images $I_1(x, y)$ and $I_2(x, y)$ are not related, and the method 200 ends in sub-step 250.

Figure 4:
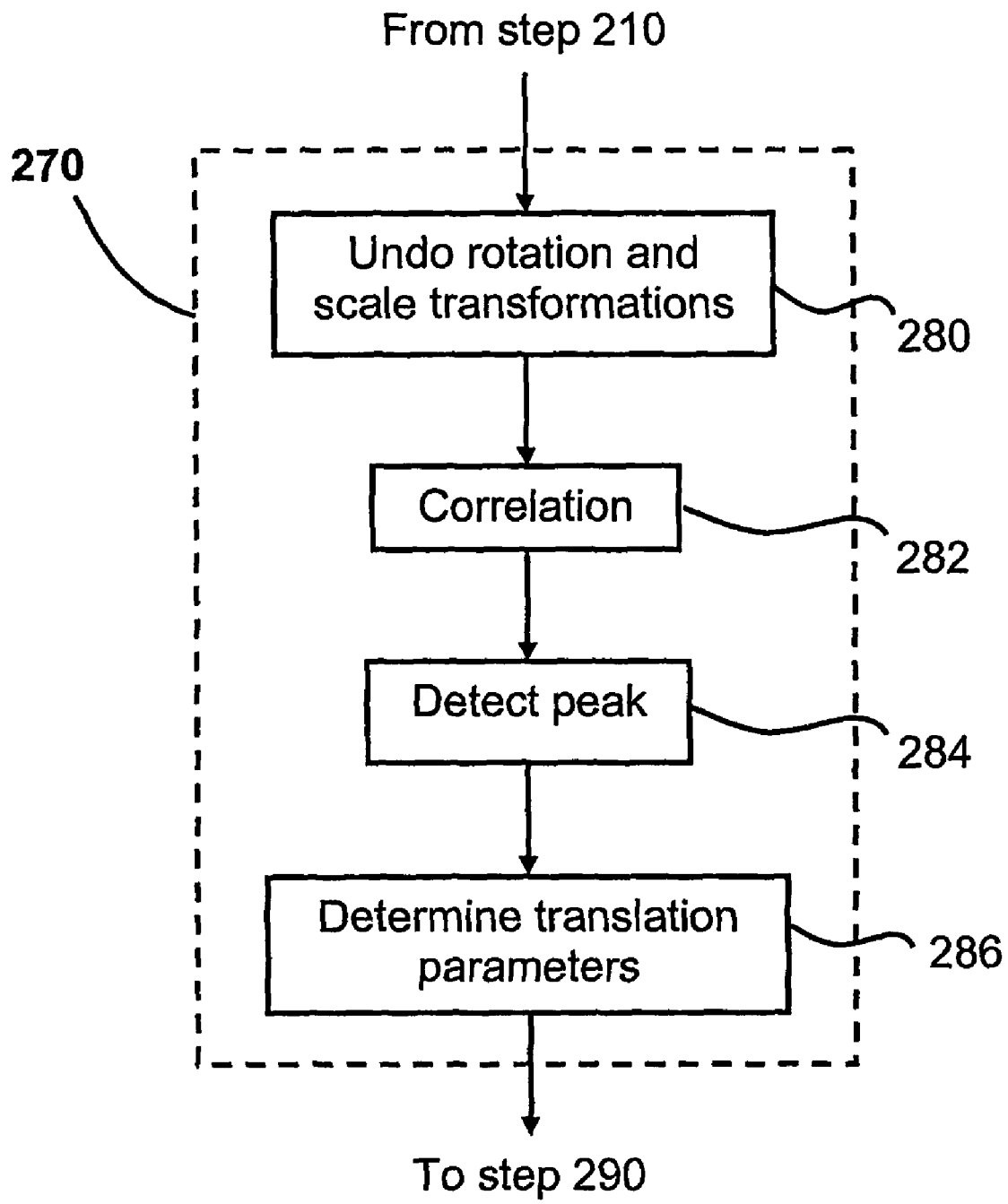
FIG. 4 shows a more detailed flow diagram of a step of determining the translation parameters which relates the two images, and performed in the method shown in FIG. 1.

FIG. 4 shows a more detailed flow diagram of step 270 (FIG. 1) where the translation $(\Delta_x, \Delta_y)$, which relates the two images $I_1(x, y)$ and $I_2(x, y)$, is determined. In sub-step 280 the rotation and scale transformations, determined in sub-step 222 (FIG. 3), are performed on image $I_1(x, y)$, thereby undoing those transformations to form image $I'_1(x, y)$. Optionally the transformations may be performed on the complex image $\bar{I}_1(x, y)$. The rotated and scaled transformed image $I'_1(x, y)$ and the original image $I_2(x, y)$ are then correlated in sub-step 282, using phase correlation, to produce another correlation image. The position of a magnitude peak in this correlation image will generally correspond to the translation $(\Delta_x, \Delta_y)$ relating images $I_1(x, y)$, and $I_2(x, y)$. Accordingly, in sub-step 284 the processor 105 detects the location of the magnitude peak within the correlation image.

The processor 105 then, in sub-step 286, uses the location of the magnitude peak to determine the translation parameters $(\Delta_x, \Delta_y)$ which relate the two images $I'_1(x, y)$ and $I_2(x, y)$. The same translation parameters $(\Delta_x, \Delta_y)$ also relate the original two images $I_1(x, y)$ and $I_2(x, y)$. If the magnitude peak is at location $(x_0, y_0)$, then the translation $(\Delta_x, \Delta_y)$ is $(-x_0, -y_0)$. Thus, the unknown scale s and rotation angle θ parameters have been determined in sub-step 222, and the unknown translation parameters $(\Delta_x, \Delta_y)$ have been determined in sub-step 286. Those parameters are passed to step 290 (FIG. 1) for producing the output.

Figure 5:
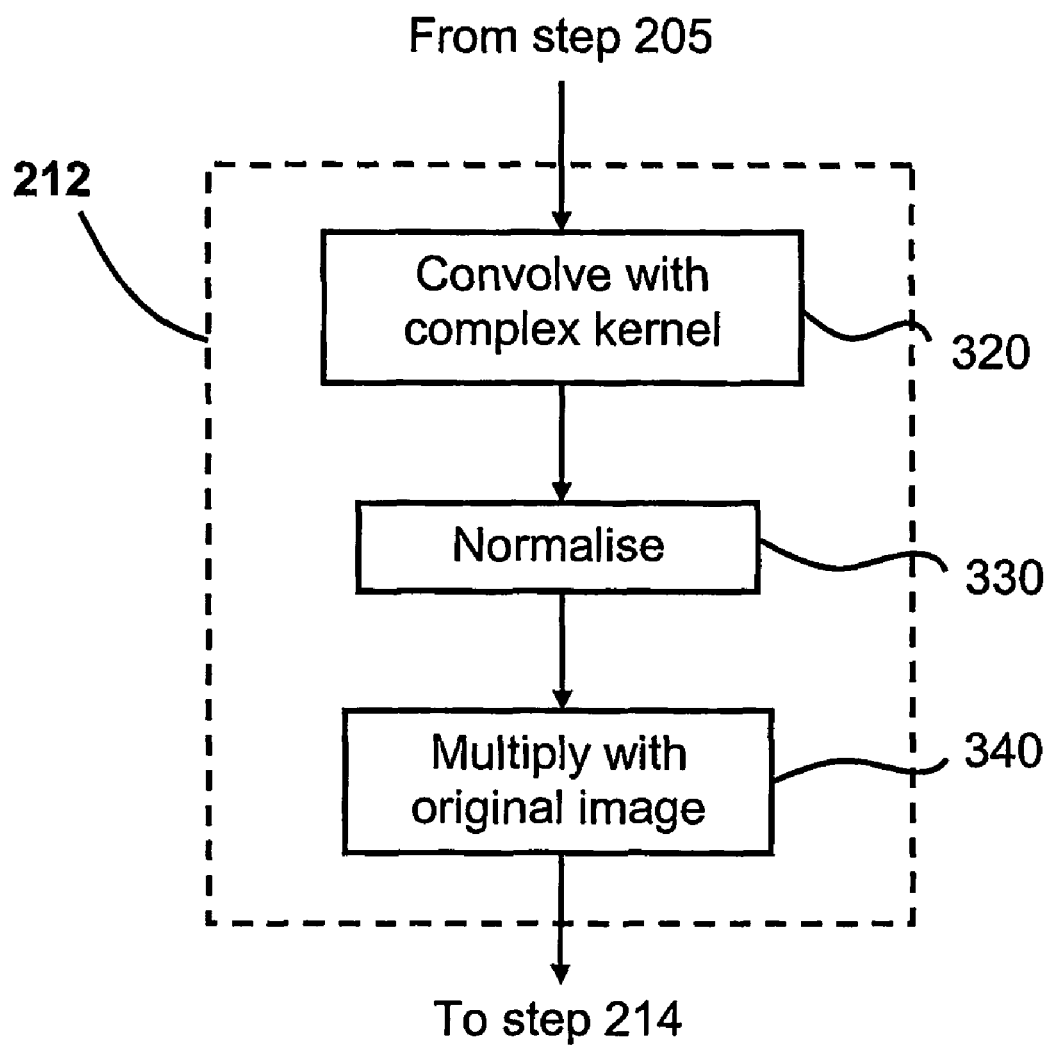
FIGS. 5 and 6 show more detailed flow diagrams of alternate implementations of forming a complex image from an image with real values, and are sub-steps of a step in FIG. 3.

FIG. 5 shows a more detailed flow diagram of a first implementation of sub-step 212 (FIG. 3) where the complex image $\bar{I}_n(x, y)$ is formed from the image $I_n(x, y)$. In sub-step 320 the image $I_n(x, y)$ is convolved with a complex kernel function k by the processor 105. The convolution may be performed in the spatial domain or through the standard technique of multiplication in the Fourier domain. The complex kernel function k used in sub-step 320 is that with a Fourier transform $K=\Im(k)$ of:

$$K(u, v) = \frac{u + iv}{|u + iv|}. \qquad (22)$$

An alternative complex kernel function k' that may be used in sub-step 320 is one with a Fourier transform $K'=\mathfrak{I}(k')$ of:

$$K'(u, v) = u + iv. \tag{23}$$

The result of the convolution ((I*k), where * denotes convolution,) is normalised in sub-step 330 to have unit magnitude, $$\Gamma = \frac{I*k}{|I*k|}, \tag{24}$$

Finally, the normalised result of the convolution $\Gamma$ is multiplied with the original image $I_n(x, y)$ in sub-step 340 to form the complex image $\bar{I}_n(x, y)$. The complex image $\bar{I}_n(x, y)$ has the same magnitude as the original image $I_n(x, y)$, but each point in the complex image $\bar{I}_n(x, y)$ has an associated phase generated by the convolution in sub-step 320. For the kernels k and k' given in Equations (22) and (23), the associated phase encodes a quantity related to the gradient direction of the image $I_n(x, y)$.

Figure 6:
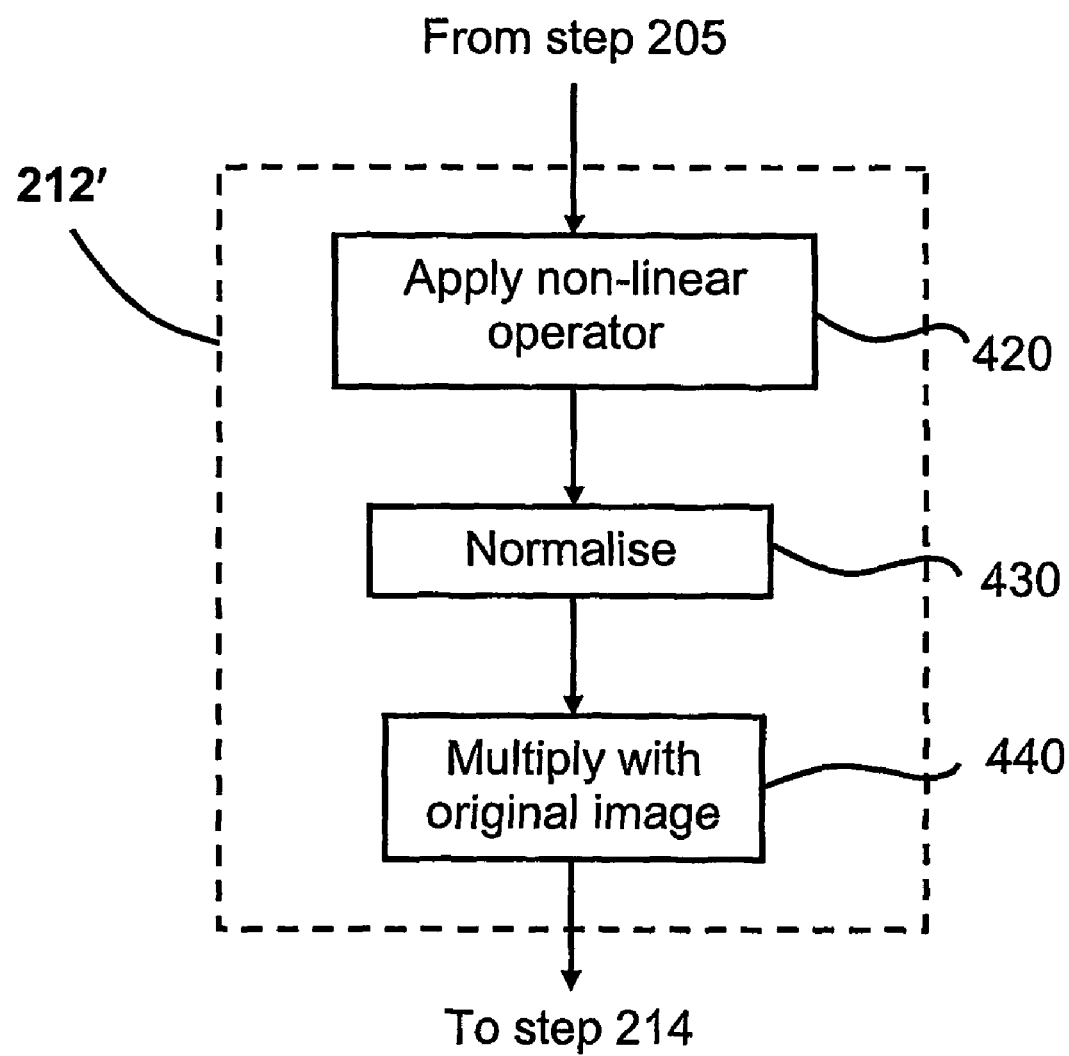

FIG. 6 shows a more detailed flow diagram of a second (alternate) implementation of sub-step 212 (FIG. 3) where the complex image $\bar{I}_n(x, y)$ is formed from the image $I_n(x, y)$. In sub-step 420 the processor 105 applies a non-linear operator to the image $I_n(x, y)$ to produce a complex image. The non-linear operator applied in sub-step 420 is the energy operator, which may be described by $$E[I] = ID^2I - (DI)^2, \tag{25}$$

where D is the derivative operator $$D = \frac{\partial}{\partial x} + i\frac{\partial}{\partial y}. \tag{26}$$

An alternative non-linear operator that may be applied in sub-step 420 to produce the complex image is the uni-modular energy operator:

$$E'[I] = ID'^2I - (D'I)^2, \tag{27}$$

where D' is the uni-modular derivative operator. The uni-modular derivative operator D' may be described as an operation in the Fourier domain as follows:

$$D'(I) = \mathcal{F}^{-1}\left[\mathcal{F}[I]\frac{u+iv}{|u+iv|}\right]. \tag{28}$$

Preferably, in sub-step 430 which follows sub-step 420, the result of the non-linear operator applied to image $I_n(x, y)$ is normalised to unit modulus, and the result of this normalisation is multiplied by the original image $I_n(x, y)$ in sub-step 440 to form the complex image $\bar{I}_n(x, y)$. Alternatively, the result of the non-linear operator applied to image $I_n(x, y)$, hence the output of sub-step 420 may be used as the complex image $\bar{I}_n(x, y)$.

Figure 7:
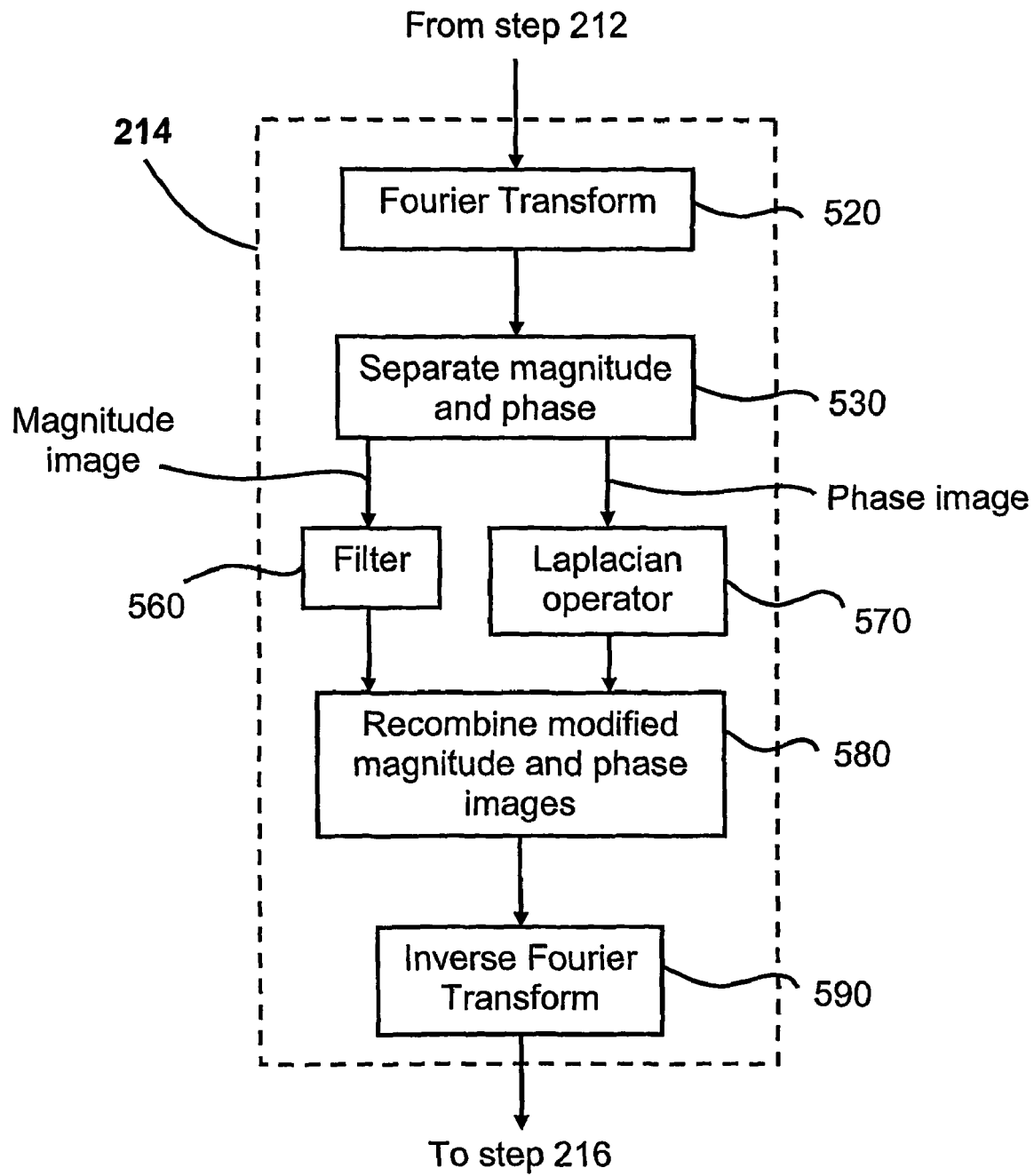
FIG. 7 shows a more detailed flow diagram of forming a representation that is translation invariant in the spatial domain of one of the complex images, and are sub-steps of a step in FIG. 3.

FIG. 7 shows a more detailed flow diagram of forming a representation $T_n(x, y)$ of one of the complex images $\bar{I}_n(x, y)$ that is translation invariant in the spatial domain performed in sub-step 214 (FIG. 3). Sub-step 214 receives as input the complex images $\bar{I}_n(x, y)$ formed in sub-step 212. Each complex image $\bar{I}_n(x, y)$ is first Fourier transformed by the processor 105 in sub-step 520, using the FFT, thereby producing an image consisting of complex values. This image is separated in sub-step 530 into two separate images, those being a magnitude image containing the magnitudes of the complex values of the Fourier transform, and a phase image containing the phases of the complex values of the Fourier transform. In sub-step 560 a function is applied to the magnitude image, with the function being commutative within a constant to rotation and scale. In the preferred implementation the magnitude image is multiplied by a ramp function to perform high-pass filtering of the magnitude image. In sub-step 570 an operator is applied to the phase image to take the second or higher derivative of the phase, which is a translation invariant. In the preferred implementation the Laplacian operator is used.

Sub-step 214 continues to sub-step 580 where the modified magnitude image produced from sub-step 560, and the result of taking the Laplacian of the phase image produced from sub-step 570 are combined through $$|F| + iA\nabla^2\phi \tag{29}$$

where |F| is the modified magnitudes of the Fourier transform of the complex images $\bar{I}_n(x, y)$, $\nabla^2\phi$ is the Laplacian of the phase image of the Fourier transform, and A is a scaling constant set to:

$$A = \max(|F|)/\pi. \tag{30}$$

The scaling constant A ensures that the recombined Fourier magnitude and phase information are roughly of equal magnitude.

The result of the combining of the modified magnitude image and the result of taking the Laplacian of the phase image is then inverse Fourier transformed in sub-step 590, thereby producing the representation $T_n(x, y)$ that is translation invariant in the spatial domain.

Other translation invariants of the Fourier magnitude and phase may be used in place of sub-steps 560 and 580, such as:
the modulus squared of the Fourier magnitude;
the logarithm of the Fourier magnitude;
the Laplacian of the logarithm of the Fourier transform; or operators such as $$\left(\left(\frac{\partial^2}{\partial u^2} + \frac{\partial^2}{\partial v^2}\right) + i\left(\frac{\partial^2}{\partial u \partial v} - \frac{\partial^2}{\partial v \partial u}\right)\right)(\log F) \tag{31}$$

and $$\left(\left(\frac{\partial^2}{\partial u^2} - \frac{\partial^2}{\partial v^2}\right) + i\left(\frac{\partial^2}{\partial u \partial v} + \frac{\partial^2}{\partial v \partial u}\right)\right)(\log F) \tag{32}$$

where the logarithm of a complex number is defined as $$\log F = \log |F| + i\phi. \tag{33}$$

Preferably, the translation invariant is free of 180° ambiguity with respect to rotation. This holds for all translation invariants listed above, except the modulus squared of the Fourier magnitude.

Figure 8:
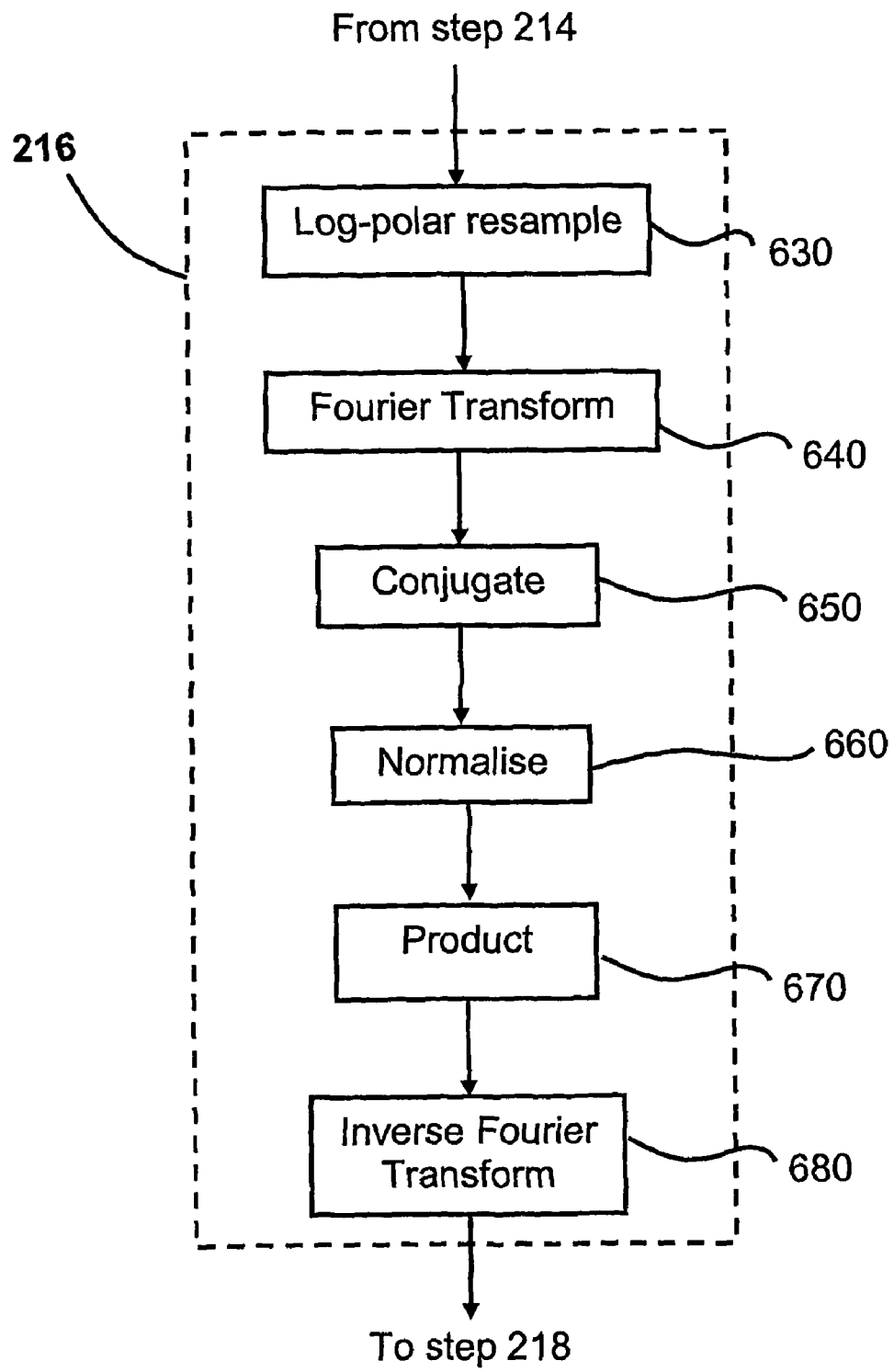
FIG. 8 shows a more detailed flow diagram of performing Fourier-Mellin correlation, which is performed in a step in FIG. 3.

FIG. 8 shows a more detailed flow diagram of the sub-step of performing in sub-step 216 the Fourier-Mellin correlation on the representations $T_1(x, y)$ and $T_2(x, y)$ that are translation invariant in the spatial domain. In sub-step 630 each of the representations $T_1(x, y)$ and $T_2(x, y)$ is resampled to the log-polar domain. In order to resample to the log-polar domain, it is necessary to specify a resolution within the log-polar domain. If the original images $I_1(x, y)$ and $I_2(x, y)$ are N pixels wide by M pixels high, hence the coordinate x varies between 0 and N−1, while the y-coordinate varies between 0 and M−1, then the centres of the representations $T_1(x, y)$ and $T_2(x, y)$ which are translation invariant in the spatial domain are located at $(c_x,c_y)=(\text{floor}(N/2), \text{floor}(M/2))$. Log-polar resampling to an image having dimensions P pixels by Q pixels in log-polar space is performed relative to this centre. To avoid a singularity at the origin, it is necessary to ignore a disc of radius $r_{min}$ pixels around the centres of the representations $T_1(x, y)$ and $T_2(x, y)$. While ignoring this disc, a point (x,y) in the log-polar plane is determined by interpolating the translation invariant image at the point (x,y) as follows:

$$x = c_x + \cos\frac{2\pi j}{Q} r_{min} e^{ai} \quad (34)$$

$$y = c_y + \sin\frac{2\pi j}{Q} r_{min} e^{ai}$$

wherein $$a = \frac{\log r_{max}/r_{min}}{P-1} \quad (35)$$

and $$r_{max} = \max\{M/2, N/2\} \quad (36)$$

denotes the maximum radius in the spatial domain that the log-polar image extends to. Common values of the constants $r_{min}$, P and Q are:

$$P=Q=(M+N)/2, \text{ and} \quad (37)$$

$$r_{min}=5. \quad (38)$$

In sub-step 640 the processor 105 performs the Fourier transform on each of the resampled representations $T_1(x, y)$ and $T_2(x, y)$. Sub-step 640 is followed by sub-step 650 where the processor 105 performs a complex conjugation on the second resampled representation $T_2(x, y)$. Both Fourier transforms are then normalised in sub-step 660 so that each has unit magnitude by dividing each complex element of each Fourier transform by the magnitude of the complex element. The normalised Fourier transforms are then multiplied in sub-step 670, and the result of the multiplication is then inverse Fourier transformed in sub-step 680. A phase correlation image results.

The above describes the preferred implementations of the present disclosure and it will be understood that there are a number of modifications and/or changes that can be made thereto without departing from the scope and spirit of the disclosure. In particular, sub-step 212 (FIG. 3) where multichannel functions are formed may be lo neglected while still retaining sub-step 214 where representations that are invariant to translations in the spatial domain are formed.

Method 200 has been described in terms of operations on images $I_1(x, y)$ and $I_2(x, y)$ that have only one component. Multi-component images, such as colour images and images from multi-spectral devices can also be registered with respect to each other using method 200. This is achieved by forming a single component image from each of the multicomponent images through some algebraic combination of the components, and registering the two single component images $I_1(x, y)$ and $I_2(x, y)$ thus generated. Alternatively it may be achieved by registering each component of the first multi-component image against each component of the other multi-component image separately.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A computer-implemented method of determining at least rotation and scale parameters of a transformation relating two images, said method comprising the steps of:
    forming a spatial domain representation of each of said images that is invariant to translation of said images;
    performing correlation in the log-polar domain between said representations; detecting a magnitude peak in said correlation; and
    determining said rotation and scale parameters from the position of said magnitude peak.

2. A computer-implemented method as claimed in claim 1 wherein the step of forming said representation of said images comprises the sub-steps of, for each said image:
    performing a Fourier transform of said image to form a Fourier transformed image;
    performing a function on the magnitude component of said Fourier transformed image to form an altered Fourier transformed image, said function being commutative within a constant to rotation and scale; and
    performing an inverse Fourier transform on said altered Fourier transformed image to form said representation.

3. A computer-implemented method as claimed in claim 1 wherein the step of forming said representation of said images comprises the sub-steps of, for each said image:
    performing a Fourier transform of said image to form a Fourier transformed image;
    performing a function on the magnitude component of said Fourier transformed image to form an altered Fourier magnitude image, said function being commutative within a constant to rotation and scale;
    taking the second or higher derivatives of the phase component of said Fourier transformed image to form an altered Fourier phase image;
    combining said altered Fourier magnitude and altered Fourier phase images to form an altered Fourier transformed image; and
    performing an inverse Fourier transform on said altered Fourier transformed image to form said representation.

4. A computer-implemented method as claimed in claim 3 wherein said altered Fourier phase image is formed by applying the Laplacian operator to said phase component of said Fourier transformed image.

5. A computer-implemented method as claimed in claim 3 or 4 wherein said altered Fourier magnitude and altered Fourier phase images are combined by using said altered Fourier magnitude image as a real part of said altered Fourier transformed image, and using said altered Fourier phase image as an imaginary part of said altered Fourier transformed image.

6. A computer-implemented method of determining at least rotation and scale parameters of a transformation relating two images, said method comprising the steps of:
    forming a multi-channel function of each of said images by applying an operator to said images, said operator being commutative within a constant to rotation and scale;
    forming a representation of each of said multi-channel functions that is invariant to translation of said multichannel function;
    performing correlation in the log-polar domain between said representations; detecting a magnitude peak in said correlation; and
    determining said rotation and scale parameters from the position of said magnitude peak.

7. A computer-implemented method as claimed in claim 6 wherein the step of forming said multi-channel functions comprises the sub-steps of, for each image:

convolving said image with a complex kernel function; and
multiplying said image with the result of the convolution step, wherein said complex kernel function has the Fourier transform of:

$$k(u, v) = \frac{u + iv}{|u + iv|}.$$

8. A computer-implemented method as claimed in claim 6 wherein the step of forming said multi-channel functions comprises the sub-steps of, for each image:
convolving said image with a complex kernel function; and
multiplying said image with the result of the convolution step, wherein said complex kernel function has the Fourier transform of:

$$K'(u,v)=u+iv.$$

9. A computer-implemented method as claimed in claim 6 wherein the step of forming said multi-channel functions comprises, for each image:
applying an energy operator to said image to form said multi-channel function, where said energy operator is described by $$E'[I]=ID^2I-(DI)^2,$$

wherein D is the derivative operator.

10. A computer-implemented method as claimed in claim 6 wherein the step of forming said multi-channel functions comprises, for each image:
applying a uni-modular energy operator to said image to form said multichannel function, where said uni-modular energy operator is described by $$E'[I]=ID^2I-(D'I)^2,$$

wherein D' is the uni-modular derivative operator.

11. A computer-implemented method as claimed in claim 9 or 10 wherein the step of forming said multichannel functions comprises the further sub-step of:
normalising the result of the applying step.

12. A computer-implemented method as claimed in claim 9 or 10 wherein the step of forming said multichannel functions comprises the further sub-step of:
multiplying said image with the result of the applying step.

13. A computer-implemented method as claimed in claim 9 or 10 wherein the step of forming said multichannel functions comprises the further sub-steps of:
normalising the result of the applying step; and
multiplying said image with the result of the normalising step.

14. A computer-implemented method as claimed in any one of claims claim 6 to 13 wherein said representations are in the spatial domain.

15. A computer-implemented method as claimed in any one of claims claim 1 to 14 wherein said correlation is the Fourier-Mellin correlation.

16. An apparatus for determining at least rotation and scale parameters of a transformation relating two images, said apparatus comprising:

means for forming a spatial domain representation of each of said images that is invariant to translation of said images;
means for performing correlation in the log-polar domain between said representations;
means for detecting a magnitude peak in said correlation; and
means for determining said rotation and scale parameters from the position of said magnitude peak.

17. An apparatus for determining at least rotation and scale parameters of a transformation relating two images, said apparatus comprising:

means for forming a multi-channel function of each of said images by applying an operator to said images, said operator being commutative within a constant to rotation and scale;
means for forming a representation of each of said multi-channel functions that is invariant to translation of said multi-channel function;
means for performing correlation in the log-polar domain between said representations;
means for detecting a magnitude peak in said correlation; and
means for determining said rotation and scale parameters from the position of said magnitude peak.

18. A non-transitory computer-readable memory medium having a program stored thereon, the program being executable by a computer device for determining at least rotation and scale parameters of a transformation relating two images, said program comprising:

code for forming a spatial domain representation of each of said images that is invariant to translation of said images;
code for performing correlation in the log-polar domain between said representations;
code for detecting a magnitude peak in said correlation; and
code for determining said rotation and scale parameters from the position of said magnitude peak.

19. A non-transitory computer-readable memory medium having a program stored thereon, the program being executable by a computer device for determining at least rotation and scale parameters of a transformation relating two images, said program comprising:

code for forming a multi-channel function of each of said images by applying an operator to said images, said operator being commutative within a constant to rotation and scale;
code for forming a representation of each of said multi-channel functions that is invariant to translation of said multi-channel function;
code for performing correlation in the log-polar domain between said representations;
code for detecting a magnitude peak in said correlation; and
code for determining said rotation and scale parameters from the position of said magnitude peak.

* * * * *